(12) United States Patent
Moisel et al.

(10) Patent No.: US 10,696,208 B2
(45) Date of Patent: Jun. 30, 2020

(54) DEVICE AND METHOD FOR ADJUSTING THE LIGHT DISTRIBUTION OF A HEADLIGHT

(71) Applicant: DAIMLER AG, Stuttgart (DE)

(72) Inventors: Joerg Moisel, Neu-Ulm (DE); Axel Mueller, Schorndorf (DE); Katharina Wagner, Böblingen (DE); Marcus Fiege, Stuttgart (DE); Volker Reinhold, Herrenberg (DE); Jan Boehm, Grafenau (DE)

(73) Assignee: DAIMLER AG, Stuttgart (DE)

( * ) Notice: Subject to any disclaimer, the term of this patent is extended or adjusted under 35 U.S.C. 154(b) by 0 days.

(21) Appl. No.: 16/319,632

(22) PCT Filed: Jul. 19, 2017

(86) PCT No.: PCT/EP2017/000873
§ 371 (c)(1),
(2) Date: Jan. 22, 2019

(87) PCT Pub. No.: WO2018/019409
PCT Pub. Date: Feb. 1, 2018

(65) Prior Publication Data
US 2020/0130561 A1 Apr. 30, 2020

(30) Foreign Application Priority Data
Jul. 23, 2016 (DE) .......................... 10 2016 008 981

(51) Int. Cl.
*B60Q 1/08* (2006.01)
*B60Q 1/115* (2006.01)

(52) U.S. Cl.
CPC .............. *B60Q 1/085* (2013.01); *B60Q 1/115* (2013.01)

(58) Field of Classification Search
None
See application file for complete search history.

(56) References Cited

U.S. PATENT DOCUMENTS 8,547,018 B2  10/2013  Hagner
2014/0347179 A1  11/2014  Fleszewski et al.
(Continued)

FOREIGN PATENT DOCUMENTS

DE  102009041554 A1  6/2010
DE  102011113956 A1  3/2012
(Continued)

OTHER PUBLICATIONS

International Search Report dated Nov. 24, 2017 in corresponding/related International Application No. PCT/EP2017/000873.
(Continued)

*Primary Examiner* — Britt D Hanley
(74) *Attorney, Agent, or Firm* — Patent Portfolio Builders PLLC

(57) ABSTRACT

A device for adjusting the light distribution of a vehicle headlight with a plurality of light sources, includes a first control unit for adjusting the light distribution. The first control unit is coupled to a second control unit, the second control unit being coupled to at least one input device for inputting user settings for adjusting the light distribution in a user-defined manner and/or includes at least one interface for coupling to at least one input device of this type, the second control unit generating control data from the user settings and transmitting the control data to the first control unit in order to adjust the light distribution.

15 Claims, 1 Drawing Sheet

(56) References Cited

U.S. PATENT DOCUMENTS

Figure 1:
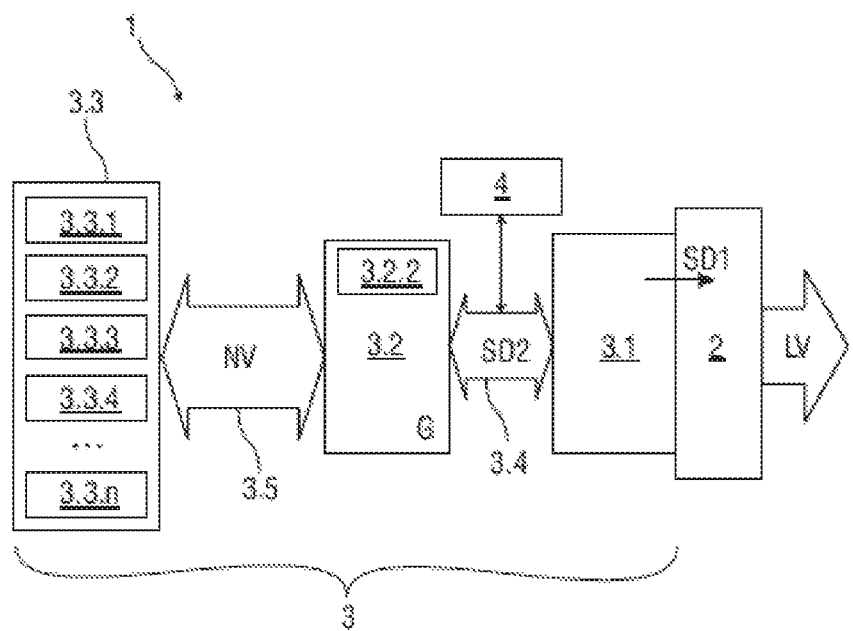

2018/0215309 A1 8/2018 Reinprecht
2018/0290583 A1* 10/2018 Park .................... B60Q 1/1423

FOREIGN PATENT DOCUMENTS

| | | | |
|---|---|---|---|
| DE | 102011055794 A1 | 5/2013 | |
| DE | 102012024513 A1 * | 7/2013 | ............. B60Q 1/24 |
| DE | 102012024513 A1 | 7/2013 | |
| DE | 102012214204 A1 | 2/2014 | |
| DE | 102014011118 A1 | 1/2016 | |
| DE | 102014111119 A1 | 2/2016 | |
| EP | 2415637 A1 | 2/2012 | |
| EP | 3202621 A1 | 8/2017 | |
| WO | 2015090516 A1 | 6/2015 | |
| WO | WO-2015090516 A1 * | 6/2015 | ............. B60Q 1/14 |
| WO | 2017020056 A1 | 2/2017 | |

OTHER PUBLICATIONS

Search Report created on May 8, 2017 in corresponding/related DE Application No. 10 2016 008 981.4.
Written Opinion dated Nov. 24, 2017 in corresponding/related International Application No. PCT/EP2017/000873.

* cited by examiner

DEVICE AND METHOD FOR ADJUSTING THE LIGHT DISTRIBUTION OF A HEADLIGHT

BACKGROUND AND SUMMARY OF THE INVENTION

Exemplary embodiments of the invention relate to a device for adjusting the light distribution of a headlight comprising a plurality of light sources. Exemplary embodiments of the invention also relate to a device for adjusting the light distribution of a headlight comprising a plurality of light sources, and to a vehicle headlight system.

DE 10 2009 041 554 A1 discloses an assembly for the basic adjustment of a vehicle headlight that performs at least one light function, using an operating unit that comprises at least one manual operating element. In addition, an analysis and control unit is provided which receives electrical signals from the operating unit, it being possible to generate the signals using the manual operating element. The analysis and control unit analyzes the received signals in order to generate control signals that can be transmitted to actuating units in the vehicle headlight in order to provide positional basic adjustment of the at least one light function.

Furthermore, DE 10 2014 011 118 A1 discloses a method for operating a light function of headlights of a motor vehicle using a display apparatus and an operating element that is separate from the display apparatus and is allocated solely to the light function, a plurality of different setting options being allocated to the light function. A user approaching the operating element and the user touching the operating element is detected and, when the user approaching or touching the operating element is detected, a display allocated to the light function is displayed on the display apparatus, with it being determined which adjustment options of the light function are currently allowed to be activated in accordance with the predetermined criterion. In the allocated display, the adjustment options of the light function that are currently allowed to be activated are displayed. The predetermined criterion represents a condition relating to an ambient brightness around the motor vehicle or a speed of the motor vehicle or an activation state of an engine of the motor vehicle or an activation state of an ignition of the motor vehicle or an open state of a door of the motor vehicle. In addition, a motor vehicle is described that comprises a display apparatus and an operating element that is separate from the display apparatus and is allocated solely to the light function, for operating the light function of headlights of the motor vehicle.

The problem addressed by the invention is to provide a device that is improved compared with the prior art, an improved method for adjusting the light distribution of a headlight, and an improved headlight system.

The device for adjusting the light distribution of a headlight, in particular a vehicle headlight, that comprises a plurality of light sources comprises a first control unit for adjusting the light distribution.

According to the invention, the device comprises a second control unit coupled to the first control unit, the second control unit being coupled to at least one input device for inputting user settings for adjusting the light distribution in a user-defined manner and/or comprising at least one interface for coupling to at least one input device of this type, the second control unit generating control data from the user settings and transmitting the control data to the first control unit in order to adjust the light distribution.

By means of the device, it is possible for a user of a vehicle, in a particularly advantageous manner, to adjust the light distribution generated by the headlight to their requirements. As a result, road safety and convenience for the user is significantly improved.

A development of the device provides that the input device is coupled to a display unit for displaying a simulation of the adjusted light distribution or comprises a display unit of this type. The display unit and the simulation of the light distribution allow the user to easily change and specify the light distribution and comprehend the light distribution in a simple manner even in bright ambient conditions in which the user cannot see the generated light distribution on the road surface, or cannot see this well enough.

In a possible embodiment of the device, the input device is only activated for inputting the user settings when the drive unit is deactivated and/or when the ignition of the vehicle is deactivated, and/or the display unit is designed to output the display of the simulation of the adjusted light distribution only when the drive unit is deactivated and/or when the ignition of the vehicle is deactivated. As a result, the user is prevented from being distracted from a driving task by inputting the user settings, and therefore road safety is increased.

In another possible embodiment of the device, the input device comprises a mobile terminal, for example a smartphone or tablet computer, a touch-sensitive screen that is arranged or can be arranged inside the vehicle, and/or a mobile memory unit, for example a memory stick or memory card. This allows the user to particularly easily input the user settings.

When using a mobile terminal or the touch-sensitive screen, user interfaces can be generated in a particularly simple manner, by means of which a desired light distribution can be specified by the user particularly easily and intuitively.

In a development of the device, it is provided that the second control unit comprises an authentication module for authenticating a user. This ensures that, for example by inputting a password or a personal identification number (PIN), only an authorized user can gain access to adjust the light distribution. The risk of tampering can therefore be reduced.

A possible embodiment of the device provides that limit values for a light range and/or a light width and/or brightness values for the light distribution are stored in the second control unit. This can ensure that the light distribution adjusted by the user corresponds to legal requirements and that the risk of any impairment, in particular dazzling, of other road users is reduced.

Another possible embodiment of the device provides that the user settings include activation conditions for a particular light distribution. For example, it can thus be specified that corresponding light distribution is generated by the headlight only when a specified condition exists, for example after opening a vehicle door, during or after unlocking and/or locking the vehicle, or within a certain environment.

The method for adjusting the light distribution of a headlight, in particular a vehicle headlight, that comprises a plurality of light sources, comprising a first control unit for adjusting the light distribution, involves, according to the invention, by means of a second control unit coupled to the first control unit and at least one input device coupled to the second control unit, transmitting user settings to the second control unit for adjusting the light distribution in a user-defined manner, and, by means of the second control unit, control data are generated from the user settings and the control data are transmitted to the first control unit in order to adjust the light distribution.

By means of the method, it is possible for a user of a vehicle, in a particularly advantageous manner, to adjust the light distribution generated by the headlight to their requirements. As a result, road safety and convenience for the user is significantly improved.

A development of the method provides that authentication of a user is carried out before the user settings are input. This ensures that, for example by inputting a password or a personal identification number (PIN), only an authorized user can gain access to adjust the light distribution. The risk of tampering can therefore be reduced.

A possible embodiment of the method provides that the parameters are specified and/or modified in the user settings during operation of the headlight. This "online setting" allows the user to see effects of modifications to the parameters immediately in the generated light distribution. This also allows the intuitive option of adjusting and modifying the parameters.

Alternatively or additionally, in a possible embodiment of the method, it is provided that the light distribution is simulated on a screen and the user specifies parameters for adjusting the illuminance distribution in the simulation. This embodiment allows the user to easily change and specify the parameters and comprehend the light distribution in a simple manner even in bright ambient conditions in which the user cannot see the generated light distribution on the road surface, or cannot see this well enough.

The vehicle headlight system according to the invention comprises at least one vehicle headlight comprising a plurality of light sources and at least one above-described device for adjusting the headlight.

The vehicle headlight system allows a user to adjust the light distribution generated by the headlight to their requirements in this case. As a result, road safety and convenience for the user is significantly improved.

A possible embodiment of the vehicle headlight system provides that the light sources comprise LEDs. Compared with conventional lighting means, such as bulbs or gas discharge lamps, LEDs can generate a light distribution that consumes less energy. Furthermore, LEDs can be actuated in a simple and reliable manner.

A possible embodiment of the vehicle headlight system provides that the light sources can be actuated individually or in groups. Therefore, different light distributions can be generated in a simple manner.

In a possible development of the vehicle headlight system, a plurality of light sources are arranged beside one another and/or above one another, in particular in what is known as an array. This makes it possible to produce different light distributions, in particular also complex light distributions, and light controls.

BRIEF DESCRIPTION OF THE DRAWING FIGURES

Figure 2:
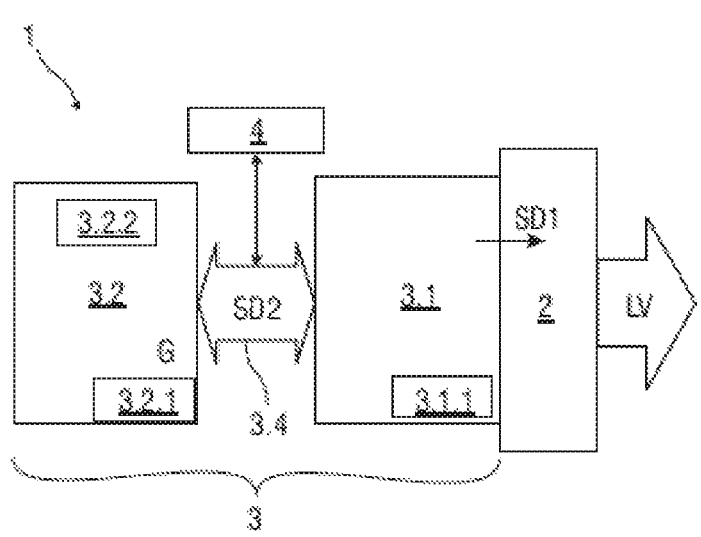

Embodiments of the invention are explained in greater detail in the following with reference to drawings, in which:

FIG. 1 schematically shows a block diagram of a first embodiment of a vehicle headlight system, and FIG. 2 schematically shows a block diagram of a detail of a second embodiment of a vehicle headlight system.

Corresponding parts are provided with identical reference signs in all the figures.

DETAILED DESCRIPTION

FIG. 1 shows a block diagram of a possible first embodiment of a vehicle headlight system 1 for a vehicle (not shown).

The vehicle headlight system 1 comprises at least one headlight 2 comprising a plurality of light sources, which are not shown in greater detail, the headlight 2 being designed to generate light distributions LV.

The headlight 2 is, for example, designed as what is known as an LED headlight and comprises a plurality of light sources that are arranged beside one another and above one another, in an array, and are designed as LEDs. In embodiments that are not shown in greater detail, the light sources may alternatively or additionally also comprise other lighting means, for example bulbs, laser light sources and/or gas discharge lamps. The light sources can be actuated individually or in groups, irrespective of their design.

Users of the vehicle have different preferences as to what light distribution LV headlights 2 should generate and what properties the generated light distribution LV should have.

This is why the vehicle headlight system 1 comprises a device 3 for adjusting the light distribution LV of the headlight 2 by means of which a user can adjust one or more light distributions LV in a user-defined manner according to their preferences.

For this purpose, the device 3 comprises a first control unit 3.1 for directly controlling the headlight 2 and thus for adjusting the light distribution LV generated by the headlight 2. To do this, the first control unit 3.1 transmits control data SD1 to the headlight 2, by means of which the light sources of the headlight 2 are actuated individually or in groups such that the light distribution LV is generated.

Furthermore, the device 3 comprises a second control unit 3.2 and an input device 3.3, the second control unit 3.2 being operated as a switching device, also referred to as a gateway, between the input device 3.3 and the first control unit 3.1. Here, the second control unit 3.2 is coupled to the first control unit 3.1 by means of a first interface 3.4 and to the input device 3.3 by means of a second interface 3.5. The first interface 3.4 is for example a bus interface, such as a CAN bus interface, or what is known as an Ethernet interface.

By means of the input device 3.3, it is possible for the user to transmit user settings NV to the second control unit 3.2 for adjusting the light distribution LV in a user-defined manner, the second control unit 3.2 generating control data SD2 from the user settings NV and transmitting the control data SD2 to the first control unit 3.1 in order to adjust the light distribution LV. In particular, in this case the user can create light distributions LV entirely by themselves or adjust preset light distributions LV according to their needs.

In order to prevent unauthorized access to the second control unit 3.2, the second control unit 3.2 comprises an authentication module 3.2.2 for authenticating the user, for example using a password or a PIN.

In order to prevent the user themselves and other road users from being dazzled, in particular limit values G for a generated light range, light width and illuminance of the light distributions LV are specified in the second control unit 3.2 that cannot be exceeded by the user settings NV.

The input device 3.3 may comprise a plurality of input apparatuses 3.3.1 to 3.3.$n$ for inputting the user settings NV.

For example, the input apparatuses 3.3.1 to 3.3.$n$ comprise a touch-sensitive screen, on which a light distribution LV to be generated is displayed. Here, the screen is preferably provided for other applications in the vehicle, for example for outputting information relating to a navigation device or an entertainment system. Using this screen, the user can, for example, first select a region of the light distribution LV to be adjusted and then adjust the light ranges and/or light widths and/or brightness values as desired.

Alternatively or additionally, the input apparatuses 3.3.1 to 3.3.*n* comprise a combined rotary push/pull slider switch, by means of which the user can navigate a marker on a coupled display unit that shows the light distribution LV and input the desired light ranges and/or light widths and/or brightness values for different positions. It is also possible for a marker projected into the actual light distribution LV to be moved by means of the input apparatuses 3.3.1 to 3.3.*n*, such that the user can adjust the light ranges and/or light widths and/or brightness values "online" and therefore can adjust these such that they are easily comprehensible in the generated light distribution LV.

In another possible embodiment, the input apparatuses 3.3.1 to 3.3.*n* comprise at least one mobile terminal, for example a smartphone or tablet computer, by means of the user interface on which the user inputs the user settings NV. Here, the second interface 3.5 is in particular designed as a cable-free interface, for example as a wireless interface.

When using a mobile terminal or the touch-sensitive screen, application programs, also referred to as "apps", are in particular operated on the input apparatuses 3.3.1 to 3.3.*n*, by means of which user interfaces are generated on a display unit of the corresponding input apparatus 3.3.1 to 3.3.*n* and are used by the user to specify a desired light distribution LV particularly easily and intuitively on the basis of the user settings NV.

Furthermore, the input apparatuses 3.3.1 to 3.3.*n* may comprise a mobile memory unit, for example a memory stick or a memory card. Using a memory unit of this type, it is possible for the user to adjust their user settings NV for example on a data processing unit, such as a PC, and to simulate the settings in a corresponding application. The user can then store the user settings NV on the memory unit. In order to transmit the user settings NV to the second control unit 3.2, the user couples the memory unit to the second control unit 3.2 by the second interface 3.5, with the user settings NV being transmitted to the second control unit 3.2. In a possible embodiment, a user interface is output to the user in this process by means of a display unit, for example the touch-sensitive screen, using which interface said user can control the transmission. Particularly preferably, an electronic vehicle key or a chip card of a Keyless Go conditional access system forms the mobile memory unit and contains the user settings in one of its memories.

In order to prevent the user from being distracted from a driving task by inputting the user settings NV and therefore to increase road safety, in a possible embodiment of the device 3 the input device 3.3 is only activated for inputting the user settings NV when the drive unit is deactivated and/or when the ignition of the vehicle is deactivated, and/or the corresponding display unit is designed to output the display of the simulation of the adjusted light distribution LV only when the drive unit is deactivated and/or when the ignition of the vehicle is deactivated. For this purpose, the first control unit 3.1 is additionally coupled by means of the first interface 3.4 to an additional control unit 4, in particular an engine control device, which provides corresponding data relating to an activation state of the device unit and/or the ignition for the first control unit 3.1.

In this case, as light distributions LV, in addition to driving light distributions, such as low beam, full beam or partial full beam, the user can additionally specify light distributions LV that are not generated while the vehicle is being driven. For example, as light distributions LV, by means of the user settings NV, the user can transmit to the second control unit 3.2 and thus specify
illumination of courtesy lights,
the projection, generated by means of the headlight 2, of information onto a surface, for example the projection of a "welcome screen" onto a garage wall when the vehicle is started up,
the reproduction of content on the screen of the mobile terminal by means of the headlight 2 and/or
the reproduction and projection of images or image sequences, for example videos.

Since it is generally not permitted to output the above-mentioned light distributions LV while the vehicle is being driven, the activation takes place based on the data provided by the additional control unit 4, in particular the engine control device, relating to the activation state of the drive unit and/or the ignition of the vehicle.

In addition, for this purpose, activation conditions for the respective light distributions LV are stored in the first control unit 3.1, such that the conditions are only activated when certain requirements are met. For example, courtesy light illumination is only activated if a vehicle door is opened and ambient brightness falls below a specified limit value G. In another example, a welcome screen is projected onto the garage wall only when the vehicle is started up and if it is located in a garage.

A possible embodiment of the device 3 provides that at least some of the above-mentioned activation conditions for a particular light distribution LV can be specified by the user themselves by means of the user settings NV.

FIG. 2 shows a block diagram of a detail of a possible second embodiment of the vehicle headlight system 1. By contrast with the first embodiment shown in FIG. 1, the first and the second control unit 3.1, 3.2 each comprise an integrated memory 3.1.1, 3.2.1 in which light distributions LV and/or the activation conditions are stored.

In this case, the conditions are stored as described based on the user settings NV being transmitted to the second control unit 3.2 by means of the input device 3.3 and then being stored in the memory 3.2.1 and/or then being processed by means of the second control unit 3.2 and subsequently being transmitted and stored in the memory 3.1.1 of the first control unit 3.1.

For example, by means of the user settings NV, an image which is intended to be displayed as a welcome screen when unlocking the vehicle is transmitted to and stored in the second control unit 3.2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A device for adjusting a light distribution of a vehicle headlight comprising a plurality of light sources, the device comprising:
   a first control unit configured to adjust the light distribution; and
   a second control unit, which is coupled to the first control unit,
   wherein the second control unit is coupled to at least one input device configured to receive inputs of user settings for adjusting the light distribution in a user-defined manner,
   wherein the second control unit is configured to generate control data from the user settings and configured to transmit the control data to the first control unit in order to adjust the light distribution, and
   wherein the second control unit is a gateway comprising an authentication module configured for authenticating a user of the device.

2. The device of claim 1, wherein the at least one input device
   is coupled to a display unit configured to display a simulation of an adjusted light distribution, or
   comprises the display unit.

3. The device of claim 1, wherein the at least one input device is configured so that inputting the user settings is activated only when a drive unit of the vehicle is deactivated, or when an ignition of the vehicle is deactivated.

4. The device of claim 1, wherein the at least one input device comprises a mobile terminal, a touch-sensitive screen that is arranged or can be arranged inside the vehicle, or a mobile memory unit.

5. The device of claim 1, wherein the second control unit comprises an authentication module for authenticating a user.

6. The device of claim 1, wherein the second control unit is configured to store limit values for a light range, a light width, or brightness values for the light distribution.

7. The device of claim 1, wherein the user settings include activation conditions for a particular light distribution.

8. A method for adjusting a light distribution of a vehicle headlight having a plurality of light sources and comprising a first control unit for adjusting the light distribution, the method comprising:
   authenticating, by a second control unit prior to allowing input of user settings, a user, wherein the second control unit comprises an authentication module for authenticating the user and the second control unit is a gateway;
   transmitting, by at least one input device, the user settings to the second control unit for adjusting the light distribution in a user-defined manner, wherein the second control unit is coupled to the first control unit and the at least one input device,
   generating, by the second control unit from the user settings, control data;
   transmitting, by the second control unit, the control data to the first control unit in order to adjust the light distribution; and
   adjusting, by the first control unit, the light distribution based on the control data.

9. A vehicle headlight system, comprising:
   at least one vehicle headlight comprising a plurality of light sources; and
   at least one device, comprising:
      a first control unit configured to adjust the light distribution; and
      a second control unit, which is coupled to the first control unit,
      wherein the second control unit is coupled to at least one input device configured to receive inputs of user settings for adjusting the light distribution in a user-defined manner
      wherein the second control unit is configured to generate control data from the user settings and configured to transmit the control data to the first control unit in order to adjust the light distribution, and
      wherein the second control unit is a gateway comprising an authentication module configured for authenticating a user of the device.

10. The device of claim 1, wherein the at least one input device comprises a plurality of input devices coupled to the second control unit.

11. The device of claim 10, wherein one of the plurality of input devices is a mobile terminal and another one of the plurality of input devices is a touch-sensitive screen arranged a vehicle comprising the device and vehicle headlight.

12. The method of claim 8, wherein the at least one input device comprises a plurality of input devices coupled to the second control unit.

13. The method of claim 12, wherein one of the plurality of input devices is a mobile terminal and another one of the plurality of input devices is a is a touch-sensitive screen arranged a vehicle comprising the vehicle headlight.

14. The vehicle headlight system of claim 9, wherein the at least one input device comprises a plurality of input devices coupled to the second control unit.

15. The vehicle headlight system of claim 14, wherein one of the plurality of input devices is a mobile terminal and another one of the plurality of input devices is a is a touch-sensitive screen arranged a vehicle comprising the at least one device and vehicle headlight system.

* * * * *